(12) United States Patent
Lawrence

(10) Patent No.: US 6,217,284 B1
(45) Date of Patent: Apr. 17, 2001

(54) OSCILLATING FLUID FLOW MOTOR

(76) Inventor: Brant E. Lawrence, 26600 Gail La., Middleton, ID (US) 83644

( * ) Notice: Subject to any disclaimer, the term of this patent is extended or adjusted under 35 U.S.C. 154(b) by 0 days.

(21) Appl. No.: 09/447,439

(22) Filed: Nov. 22, 1999

(51) Int. Cl.[7] .................................................. F03D 5/06
(52) U.S. Cl. ................................ 416/83; 416/84; 415/3.1; 415/4.1; 415/7; 415/906
(58) Field of Search ............................... 415/2.1, 3.1, 4.1, 415/4.3, 7, 905, 906; 416/64, 65, 79, 83, 84, 197 A; 417/334; 290/43, 54

(56) References Cited

U.S. PATENT DOCUMENTS

| | | | |
|---|---|---|---|
| 705,967 | 7/1902 | Roeh | 416/83 |
| 802,228 | 10/1905 | Morton | 416/83 |
| 804,676 | 11/1905 | Roeh | 416/83 |
| 830,973 | 9/1906 | DeCamp | 416/79 |
| 905,320 | 12/1908 | Isham | 416/83 |
| 1,263,865 | * 4/1918 | Dale | 415/3.1 |
| 4,753,574 | 6/1988 | Hess | 416/83 |
| 4,872,805 | * 10/1989 | Horiuchi et al. | 415/7 |
| 5,899,664 | * 5/1999 | Lawrence | 416/83 |

* cited by examiner

Primary Examiner—F. Daniel Lopez
Assistant Examiner—Ninh Nguyen
(74) Attorney, Agent, or Firm—Ormiston & McKinney, PLLC

(57) ABSTRACT

An oscillating fluid flow motor and a fluid flow power system that converts the energy in the flowing fluid to mechanical energy through a vane that automatically sweeps back and forth across the flow. In one embodiment of the oscillating fluid flow motor, the motor includes (1) a support structure, (2) an elongated swing arm pivotably and rotatably mounted to the support structure, (3) a vane having a concave face, (4) an elastic link operatively coupled in tension between the swing arm and a support, and (5) a direction control mechanism operatively coupled to the swing arm. The vane is connected to the swing arm so that, upon rotation of the swing arm about its longitudinal axis, the orientation of the concave face of the vane changes relative to the flow of a fluid confronting the face. The direction control mechanism is operative to selectively re-orient the face of the vane at each of two points that define the ends of the bidirectional stroke of the swing arm.

17 Claims, 6 Drawing Sheets

OSCILLATING FLUID FLOW MOTOR

CROSS REFERENCE TO RELATED APPLICATIONS

This application is related to application Ser. No. 08/144,734 filed Oct. 28, 1993, abandoned, and U.S. Pat. No. 5,899,664 issued May 4, 1999.

FIELD OF THE INVENTION

The invention relates generally to a mechanism for converting energy of one form to another more useable form. More particularly, the invention relates to an oscillating fluid flow motor that converts energy contained in a channel of flowing fluid to mechanical energy.

BACKGROUND OF THE INVENTION

Numerous mechanisms have been designed and built for converting the energy of moving masses, such as air or water, to mechanical energy. Commonly known mechanisms for converting the energy of moving water to mechanical energy are water wheels, paddles, and turbines. Generally speaking, mechanisms for converting the energy of a moving fluid to mechanical power have tended throughout their evolution to become both more complicated and more costly to manufacture. Modern axial flow turbine systems typically require the construction of dams or diversions and penstocks to support even low-head power production. The present invention was developed in an effort to provide a low cost in-stream system for utilizing the energy in a fluid stream, particularly a small slow moving stream, as a pumping station or a small scale electrical generator such as might be used effectively in remote or undeveloped areas around the world.

In the early 1900s, John Roeh patented an Automatic Current Motor, U.S. Pat. Nos. 705,967 and 804,676, that extracted energy from a stream flow using a vane attached to a tiller. As the water flows past the vane, the vane automatically sweeps back and forth across the stream under the bidirectional control of a cross cabling system. A connecting rod transmits the energy in the oscillating tiller to some type of receiving machine to produce useful work. Mr. Roeh's system, while presenting a potentially workable small scale in-stream generating or pumping station, is disadvantageous because it requires a fairly complex mechanical linkage to achieve the bidirectional control necessary to make the vane sweep automatically back and forth across the stream.

The present invention improves upon the oscillating fluid flow motor disclosed in U.S. Pat. No. 5,889,664. The improvements result from further testing and study of the motor's basic design.

SUMMARY

The present invention is directed to an oscillating fluid flow motor and a fluid flow power system that converts the energy in the flowing fluid to mechanical energy through a vane that automatically sweeps back and forth across the flow. In one embodiment of the oscillating fluid flow motor, the motor includes (1) a support structure, (2) an elongated swing arm pivotably and rotatably mounted to the support structure, (3) a vane having a concave face, (4) an elastic link operatively coupled in tension between the swing arm and a support, and (5) a direction control mechanism operatively coupled to the swing arm. The vane is connected to the swing arm so that, upon rotation of the swing arm about its longitudinal axis, the orientation of the concave face of the vane changes relative to the flow of a fluid confronting the face. The direction control mechanism is operative to selectively re-orient the face of the vane at each of two points that define the ends of the bi-directional stroke of the swing arm.

In one embodiment of the invented fluid flow power system, the system includes (1) a channel, (2) fluid flowing through the channel, (3) an elongated swing arm pivotably mounted in or over the channel, (4) a vane connected to the swing arm, the vane having a concave face confronting the flowing fluid, (5) a direction control mechanism coupled to the vane, and (5) a receiving machine operatively coupled to the swing arm. The direction control mechanism is operative to selectively re-orient the vane in the flowing fluid by rotating the swing arm about its longitudinal axis at each of two points which define the ends of the bi-directional stroke of the swing arm.

In another embodiment of the invention, a method for converting the energy of a flowing fluid to mechanical energy includes providing a vane having a concave face connected to a swing arm, directing the face of the vane into the flowing fluid, causing the vane to traverse the flowing fluid in a reciprocating motion by selectively rotating the swing arm about its longitudinal axis to re-orient the vane in the flowing fluid at each of two points which define the ends of a bidirectional stroke of the swing arm.

DETAILED DESCRIPTION

Figure 1:
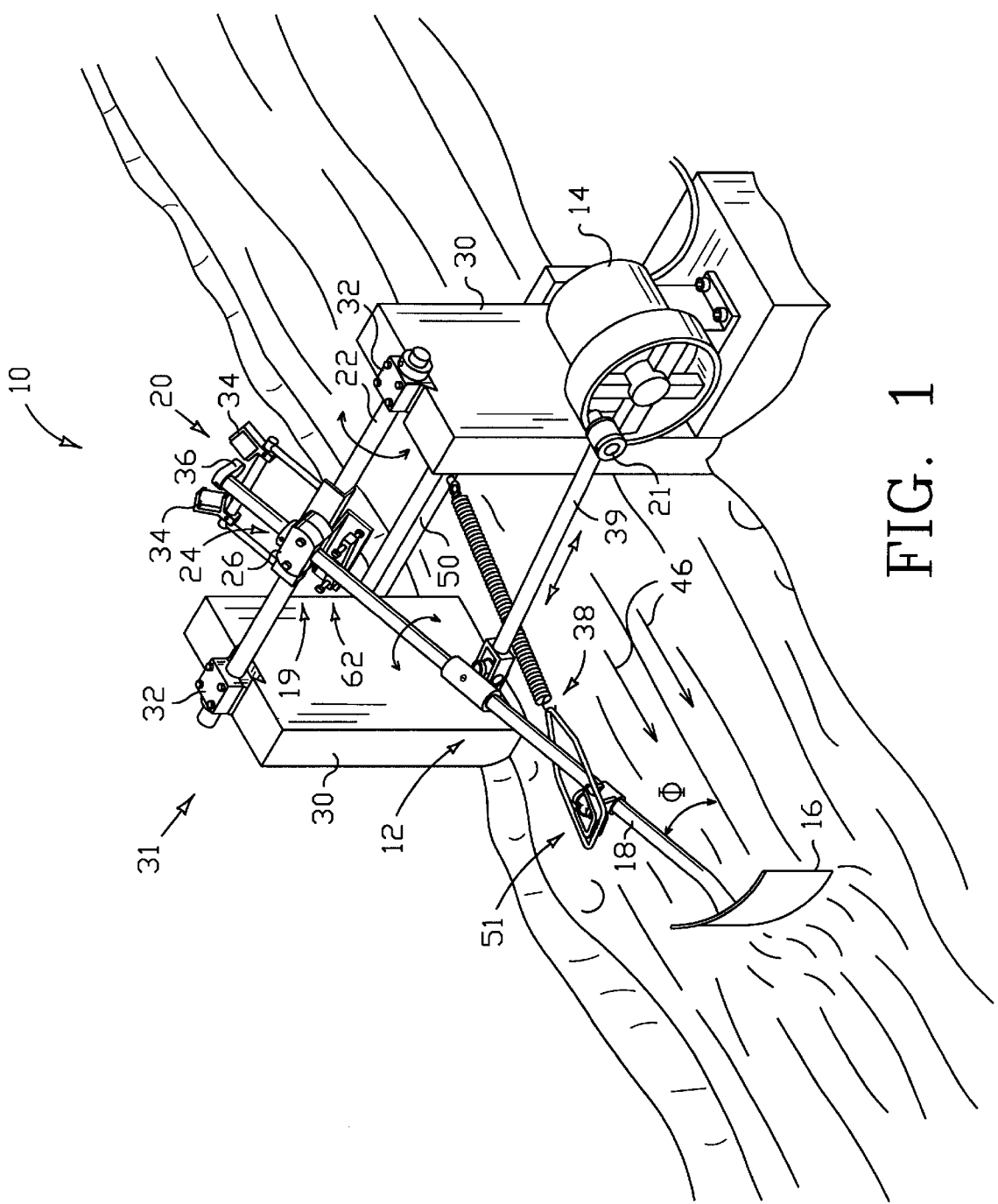
FIG. 1 is an isometric view of an oscillating fluid flow motor incorporated into an in-stream fluid power system wherein the swing arm extends away from the vane in a direction generally upstream of the vane.

FIG. 1 depicts an in-line fluid flow power system, designated generally by reference numeral 10, such as might be used in a small stream or irrigation canal as a pumping station or electric power generator. On a larger scale the in-line fluid flow power system could be used in a river or other larger flowing body of water. Referring to FIG. 1, power system 10 includes an oscillating fluid flow motor 12 and an on-shore receiving machine 14. Receiving machine 14 represents generally any of the various machines operable through the reciprocating motion generated by motor 12, such as a pump, electric generator, mill or compressor.

Motor 12 consists of three basic components-a vane 16, a swing arm 18, and a direction control mechanism 20. Vane 16 is attached to one end of swing arm 18. Swing arm 18 is fixed along its length at a point 9 at which the swing arm pivots. In the embodiment of the invention shown in FIGS. 1, 4–6, swing arm 18 is mounted to a horizontal support member 22 through a pivot assembly 24. Pivot assembly 24 allows swing arm 18 to rotate about its longitudinal axis and to pivot relative to support member 22. Pivot assembly 24 includes pillow block 26, or another suitable bearing device, and pivot pin 28 (shown in FIGS. 4–6). Swing arm 18 rotates about its longitudinal axis in pillow block 26 and pivots on pivot pin 28. Horizontal member 22 has two ends, each of which are secured to uprights 30 by block assemblies 32. In one embodiment, horizontal member 22 and uprights 30 combine to form a base or support structure 31 for motor 12. Horizontal member 22 rotates about its longitudinal axis within block assemblies 32, thereby allowing vertical adjustment of vane 16 relative to the surface of the flowing water.

It is desirable to bias vane 16 against the flow of fluid and limit the vertical motion of swing arm 18 help keep the lower portion of vane 16 at a predetermined level with respect to the surface of the water. This is accomplished, for example, by an elastic link 38 operatively coupled in tension between swing arm 18 and a support structure 50. In the embodiment shown in the Figures, elastic link 38 is an extension spring 54. Other articles and devices could be used for elastic link 38. Torsion bars, leaf springs, elastic bands, or fluid systems, for example, could be used to provide an elastic link between swing arm 18 and support structure 50.

Figure 2:
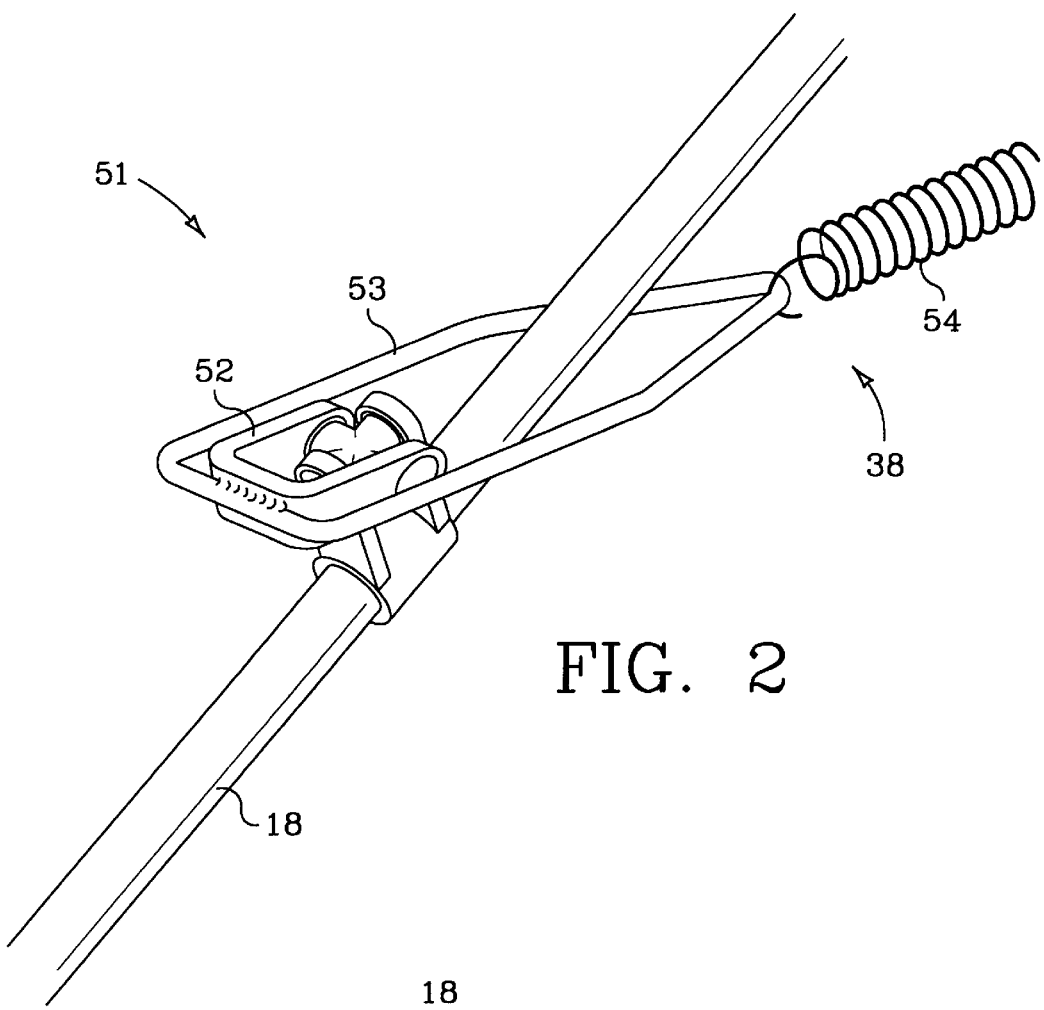
FIG. 2 is an isometric detail view of the flexible joint of FIG. 1 coupling the extension spring to the swing arm.

Referring to FIGS. 1 and 2, spring 54 is coupled at one end to swing arm 18 through a flexible joint 51 and at the opposite end to support structure 50. Spring 54 is coupled to swing arm 18 below the point 19 at which swing arm 18 pivots relative to base 31 and support 50 is positioned upstream of vane 16. Other configurations may also be used. For example, if spring 54 is coupled to swing arm 18 above pivot point 19, then support structure 50 would be positioned downstream of base 31 to bias vane 16 against the flow. As shown in FIG. 2, flexible joint 51 incorporates a universal joint 52 and a cross link ring 53. A ball joint or any other suitable joint allowing a free range of motion, preferably allowing link 38 and swing arm 18 to pivot relative to one another about at least two axes, could also be used.

Preferably, the rate or load per unit of deflection of elastic link 38 is adjustable to maintain smooth pivotal motion of the swing arm 18 and to ensure that the lower edge of vane 16 is submerged and the upper edge is kept slightly above surface level while vane 16 traverses the flow. Alternatively, a rotational stop could be installed behind horizontal support member 22 or over swing arm 18 to limit the vertical motion of swing arm 18. As an alternative to, or in combination with, these mechanical stop mechanisms, vane 16 could be weighted or buoyancy added according to the anticipated flow conditions, in conjunction with the overall hydrodynamic design of the vane, to maintain vane 16 at the desired level. Other suitable mechanisms could be used. For example, the design of vane 16 could incorporate a wing or other hydrodynamic feature that reacts to the flow to keep the vane at the desired level in the stream.

In operation, swing arm 18 is positioned above a flow of fluid, preferably, at an angle near 90° relative to the surface of the fluid flow such that front face 15 of vane 16 is positioned within and confronting flow 46. Swing arm 18 is rotated along its longitudinal axis such that one edge of vane 16 is positioned upstream, while the second and opposite edge is positioned downstream. This orientation of vane 16 causes the leading edge to push against the flow and to act as a rudder, forcing vane 16 to traverse the flow.

Direction control mechanism 20 regulates the pivotal and rotational movement of swing arm 18. As swing arm 18 reaches a first outer limit of travel, the direction control mechanism 20 causes the swing arm 18 to rotate in a first direction about its longitudinal axis inside pivot assembly 24. As swing arm 18 rotates, the orientation of vane 16 in relationship to the flow reverses. Consequently, the edge of vane 16 which was previously the leading edge, is now the trailing edge, and the edge which acted originally as the trailing edge is now the leading edge, thus reversing the direction vane 16 traverses the flow. Vane 16 traverses back across the flow until swing arm reaches a second outer limit of travel, and direction control mechanism 20 causes the swing arm to rotate in a second opposite direction about its longitudinal axis inside pivot assembly 24 again reversing the direction of vane 16 across the flow.

Figure 4:
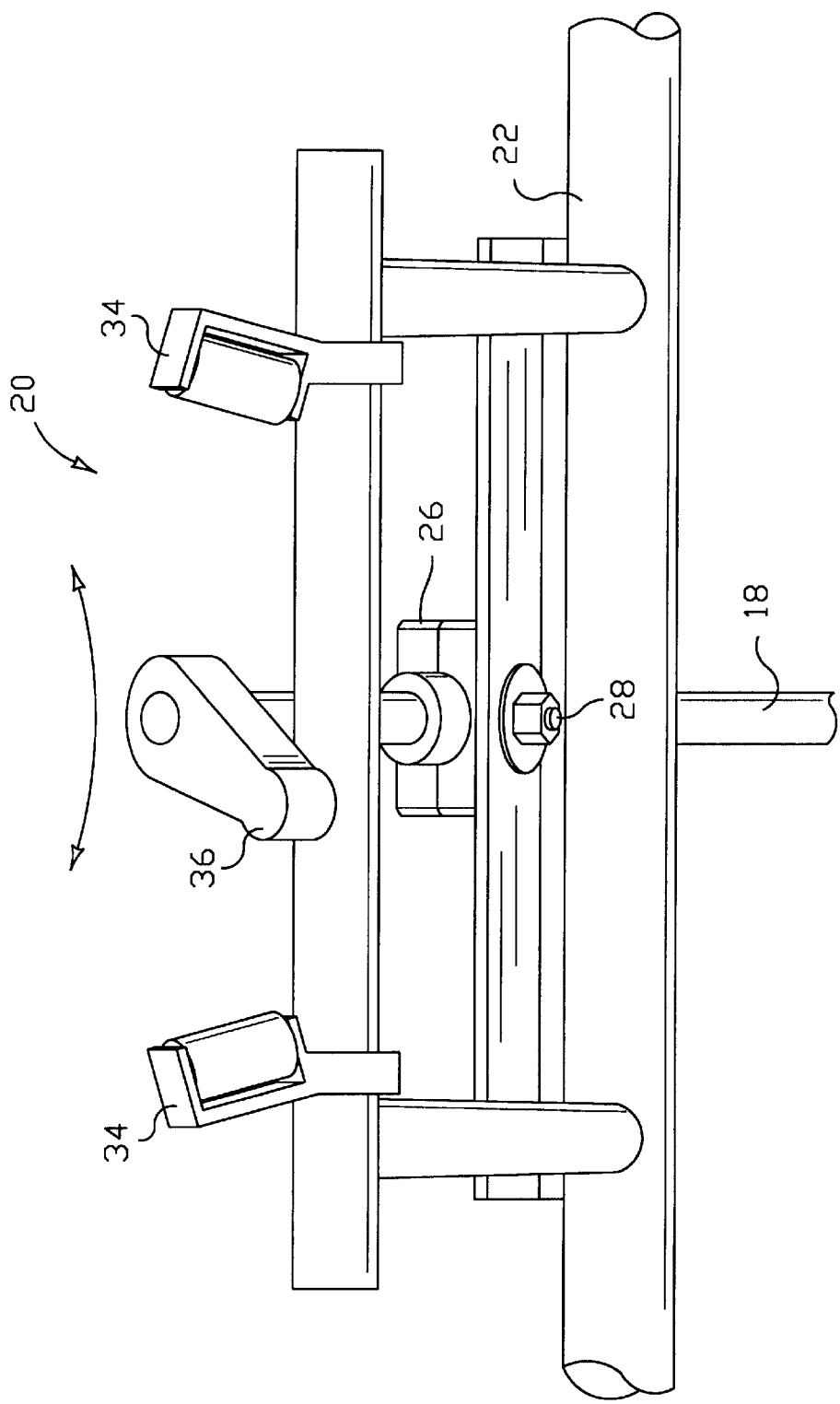
FIG. 4 is an isometric detail view of a direction control mechanism utilizing roller stops.
Figure 5:
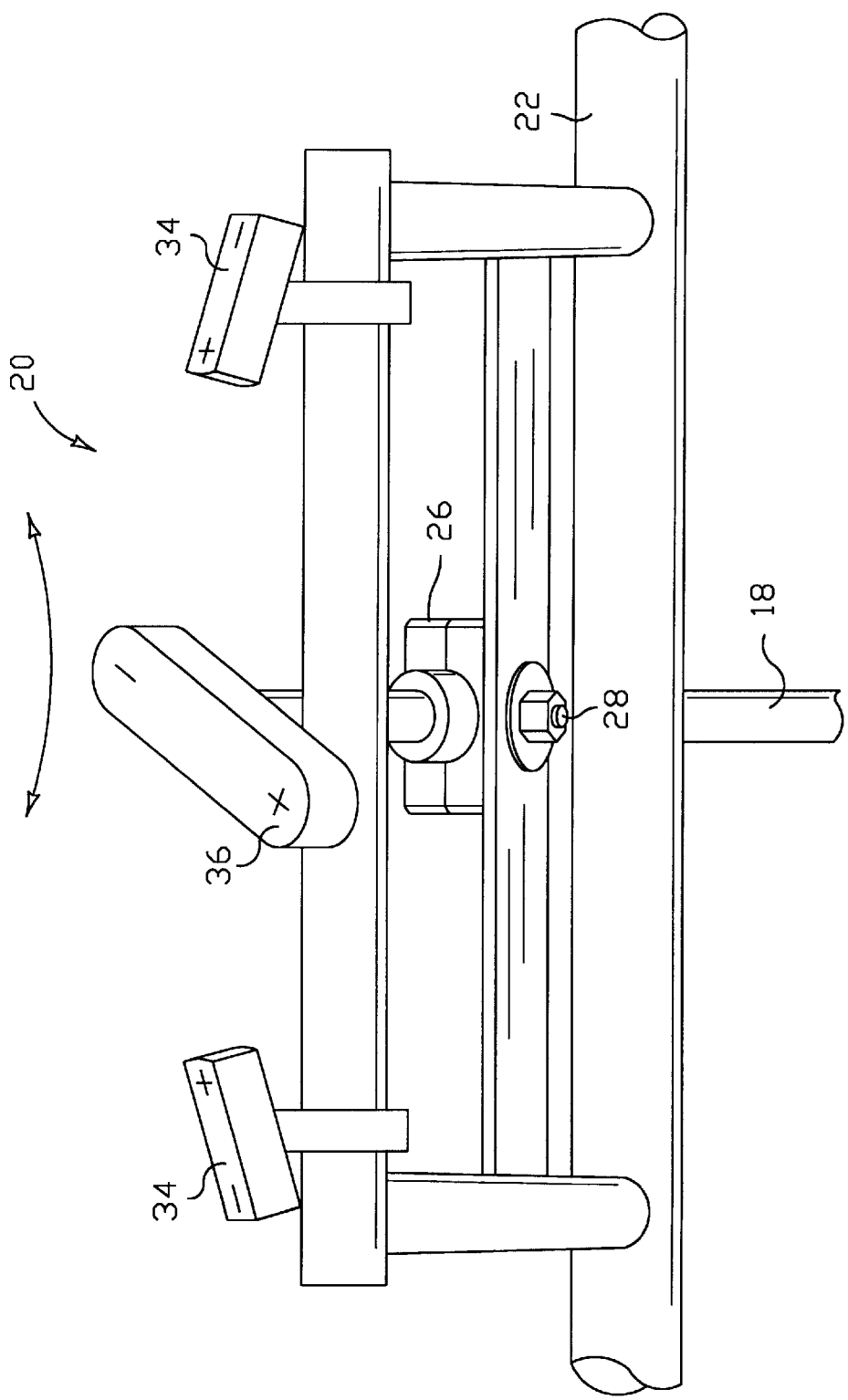
FIG. 5 is an isometric detail view of a second embodiment of a direction control mechanism utilizing magnetic repulsion.
Figure 6:
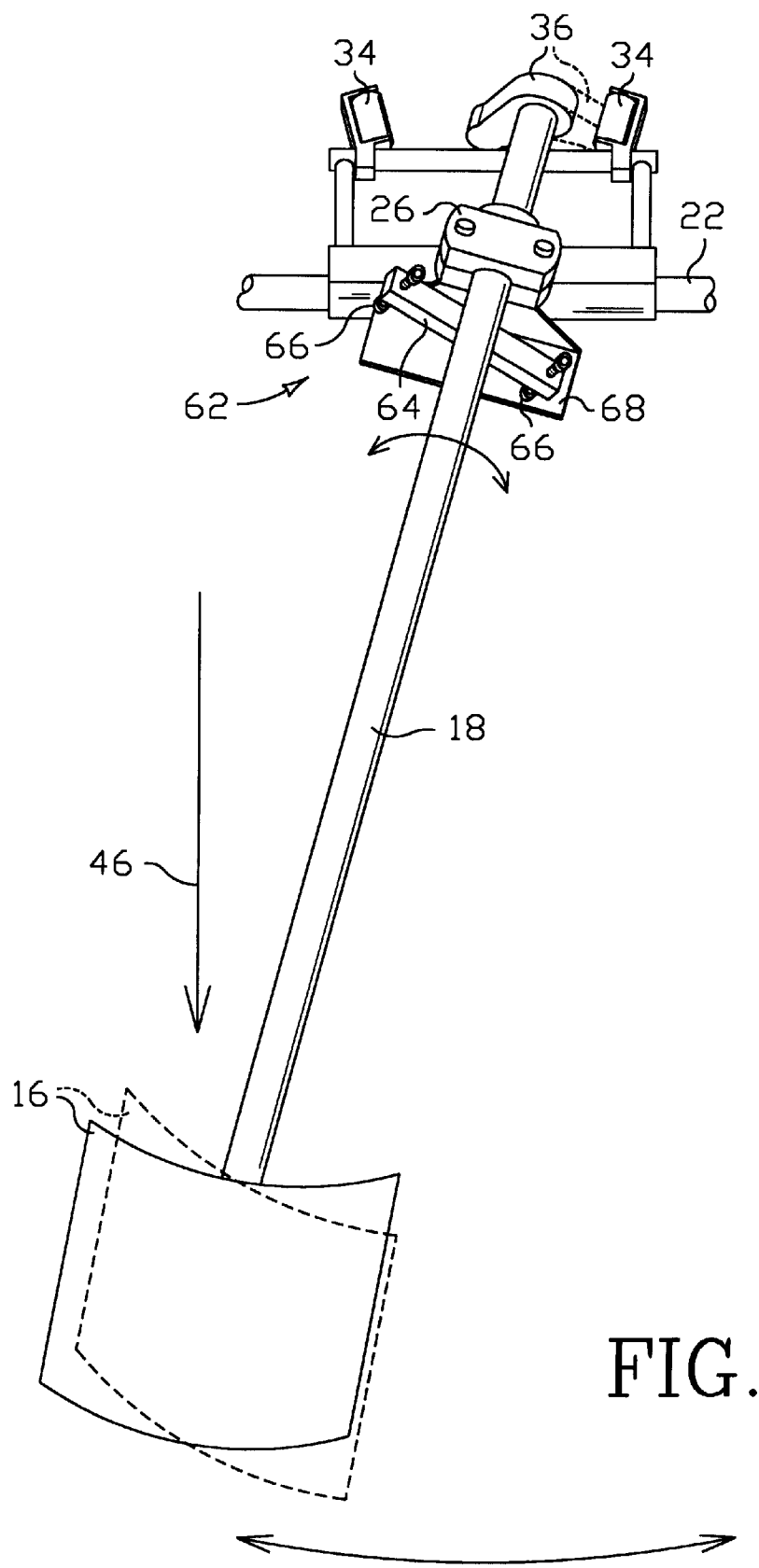
FIG. 6 is a partial isometric view of a vane and swing arm showing the change in direction at the end of one stroke of the swing arm.
Figure 7:
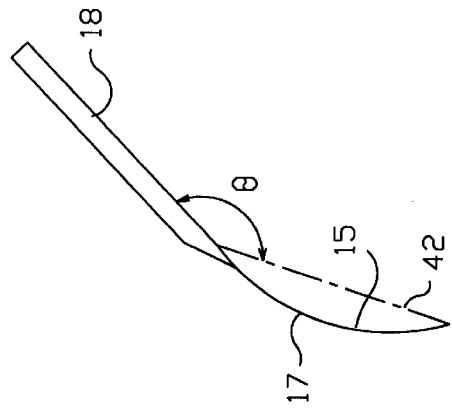
FIG. 7 is a detail isometric view of a vane having a front face that is concave along its longitudinal and transverse axes, a convex rear face and a curved peripheral edge.

In one particular embodiment as depicted in FIGS. 4 and 5, the direction control mechanism 20 includes a limit arm 36 attached to one end of swing arm 18 and two adjustable stops 34 attached to horizontal support member 22, one on either side of pivot assembly 24. In FIG. 4, stops 34 include rollers to reduce wear on stops 34 and limit arm 36. As swing arm 18 reaches either the first or second outer limit of travel, defined by the location and position of the adjustable stops 34 relative to limit arm 36, limit arm 36 acts on the corresponding stop 34 and rotates swing arm 18 about it longitudinal axis inside pivot assembly 24. A relatively light contact between limit arm 36 and stop 34 helps improve the operation of direction control mechanism 20. Flexible joint 51, described above, functions to this end assisting direction control mechanism 20 to more smoothly rotate swing arm 18 at the end of each stroke.

Direction control mechanism 20, as described above, causes swing arm 18 to rotate about its longitudinal axis as limit arm 36 makes contact with stop 34. In an alternative embodiment shown in FIG. 5, direction control mechanism 20 uses magnetic repulsion to rotate swing arm 18. The magnets in stops 34 and the limit arm 36 are aligned such that their polarity causes each stop 34 to repel limit arm 36. As limit arm 36 approaches stop 34, the repulsive force acting on limit arm 36 rotates swing arm 18 about its longitudinal axis to change the direction of swing arm 18. If electromagnets are used, the magnets may be energized when swing arm 18 or limit arm 36 triggers a proximity sensor. The strength of the magnets depends upon the size of vane 16, the length of swing arm 18 and the force of the fluid flow. Direction control mechanism 20 is not limited to stops and magnets. Any suitable mechanism for selectively applying a rotational force to swing arm 18 may be used. For example, swing arm 18 may incorporate a rotational motor and electronic monitor. As the electronic monitor senses that swing arm 18 has reached either the predetermined first or second outer limit of travel, the electronic monitor causes rotational motor to rotate swing arm 18 about its longitudinal axis.

Referring again to FIG. 1, the repeated oscillation of vane 16 through the flow and the associated stroking of swing arm 18 is transferred to receiving machine 14 by a connecting rod 39. The stroking swing arm 18 rotates crank arm 21 on receiving machine 14 through the reciprocating action of connecting rod 39. Preferably, receiving machine 14 is located such that connecting rod 39 remains close to a 90° angle relative to swing arm 18, and connecting rod 39 operates in the same plane as crank arm 21.

Figure 3:
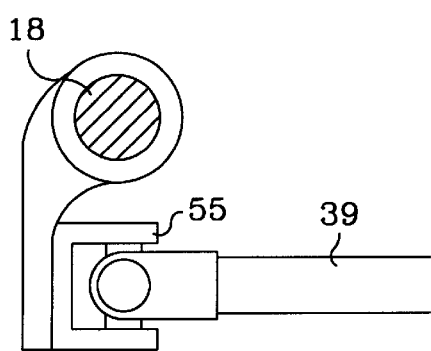
FIG. 3 is an elevation detail view of the flexible joint coupling the connecting rod to the swing arm.

The embodiment depicted in FIGS. 1 and 3, show connecting rod 39 attached to the upstream side of swing arm 18 with a flexible joint 55. As shown, flexible joint 55 may be a universal joint, ball joint or the like that allows connecting rod 39 and swing arm 18 to pivot relative to one another about at least one axis. It is desirable to couple connecting rod 39 to the upstream side of swing arm 18 at a point below support member 22. This point of connection between swing arm 18 and connecting rod 39 facilitates the proper orientation of vane 16 corresponding to the direction of the stroke of swing arm 18. This results from the combined resistance of receiving machine 14 and the pressure of the fluid flow against vane 16. Alternatively, and to the same effect, connecting rod 39 could be attached to the downstream side of swing arm 18 at a point above support member 22.

The universal joint cross link ring assembly of flexible joint 51 serves as an automatic over-center latch that works counter to but in conjunction with flexible joint 55. The direct line of pull of elastic line 38 on swing arm 18 through joint 51 falls either to the right or left of center on shaft 18. The combined effect of flexible joints 51 and 55 helps vane 16 maintain its orientation until reaching the end of a stroke when limit arm 36 acts on a stop 34 to rotate swing arm 18.

Experimentation and study have shown the required orientation, or angle of confrontation, of vane 16 relative to the fluid flow is related to the workload of receiving machine 14. A steep angle of confrontation causes rough operation and unnecessarily increases the wear on the components. Additionally, a steeper angle of confrontation is required to start the stroking motion of swing arm 18 than is required to maintain the motion. Consequently, in the embodiment shown in FIG. 6 a limit mechanism 62 operatively coupled to swing arm 18 defines the maximum angle of confrontation of vane 16 corresponding to the stroke direction of swing arm 18. Limit mechanism 62 includes a cross bar 64 affixed to and extending out from the longitudinal axis of swing arm 18, adjustable strikers 66 projecting out from bar 64, and strike plate 68. As swing arm 18 rotates at the urging of vane 16 traversing the flow and vane 16 reaches a maximum predefined angle of confrontation, a striker 66 contacts plate 68 to prohibit further rotation of swing arm 18.

Limit mechanism 62 may be adjusted to control the angle of confrontation of vane 16. To initiate the stroking motion of swing arm 18, limit mechanism 62 is adjusted to allow a steeper angle of confrontation. As the workload of receiving machine 14 is met, the angle of confrontation is made less steep to improve operating efficiencies. The adjustability of limit mechanism 62 may also be used to improve operating efficiency under variable workloads of receiving machine 14 and varying currents and other conditions affecting the fluid flow.

It appears that the proper timing of the stroke of swing arm 18 effects the power output. A relatively short stroke midstream in the fastest portion of the fluid flow, for example, appears to increase power output. Also, the motion of vane 16 across the flowing fluid creates a wave. Consequently, the stroke of swing arm 18 may be timed so that vane 16 catches the wave created by the forward stroke on the return stroke to help increase power output. Experimentation has also shown the fluid deflecting off vane 16 scours the bed of the channel. Preferably, then, the channel, in the area surrounding vane 16, will be armored with concrete or other suitable protective material.

Figure 8:
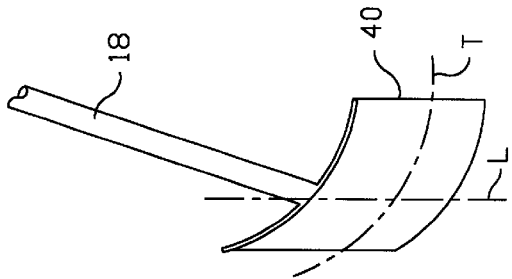
FIG. 8 is a cross section taken along the longitudinal axis of the vane of FIG. 7.
Figure 9:
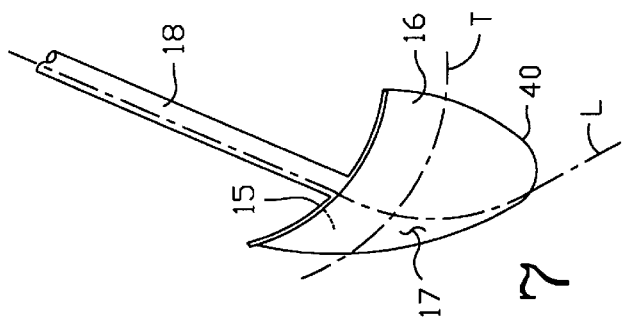
FIG. 9 is a cross section taken along the transverse axis of the vane of FIG. 7.
Figure 10:
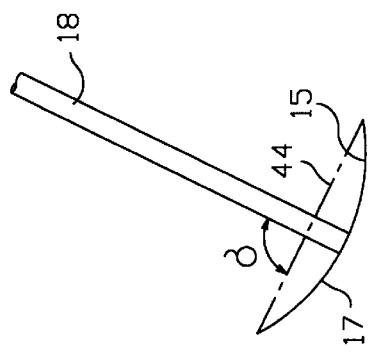
FIG. 10 is a detail isometric view of a vane having a front face that is concave only along its transverse axis and a rectilinear peripheral edge.

Several different configurations of vane 16 are shown in FIGS. 7–10. In FIGS. 79, front face 15 of vane 16 is concave along both a longitudinal axis L and a transverse axis T. Rear face 17 of vane 16 is convex along both longitudinal axis L and transverse axis T. Vane 16 has a curved peripheral edge 40. Referring to FIG. 8, the primary angle of attachment e of swing arm 18 to vane 16 is preferably in the range of 90° to 225°, most preferably in the range of 150° to 170° for the embodiment of FIG. 1, where θ is the angle between swing arm 18 and a longitudinal chord 42 of vane 16. Primary angle of attachment θ is selected to achieve the desired angle of attack Φ or "bite" of vane 16 in the fluid flow (attack angle Φ is shown in FIG. 1). The primary angle of attachment θ will vary, therefore, depending on the height of base 31 and the effective length of swing arm 18, as well as the flow conditions. Referring to FIG. 9, the secondary angle of attachment σ of swing arm 18 to vane 16 is preferably in the range of 45° to 135°, most preferably about 90°, where σ is the angle between swing arm 18 and a transverse chord 44 of vane 16. Other configurations for vane 16 are possible. For example, it is expected that vane 16 will be most efficient in certain flow conditions if it is concave only along the lateral axis T with a rectilinear peripheral edge 40, as shown in FIG. 10. The hydraulic energy that may be extracted from fluid passing over vane 16 depends on several factors, including the length of the vane, the shape of the vane and the depth and velocity of the flow. The maximum force against the vane is developed when the longitudinal chord 42 of vane 16 is perpendicular to the direction of flow. It is believed that the vane will be most efficient when it deflects the flow a maximum amount while the flow remains parallel across the vane. Cavitation and inefficiency will occur when vane 16 intercepts the flow lines. If the flow is slow, then vane 16 can deflect the flow lines more without cavitation. Conversely, if the flow is fast, then a smaller deflection will cause cavitation. Ideally, the fluid should enter vane 16 nearly parallel to the leading edge and exit nearly parallel to the trailing edge. The shape and chord length of the vane is dependent on the flow conditions. Some flow conditions may require circular concavity, while others may require parabolic or some other concavity. The exact equations of concavity will necessarily be determined, therefore, mathematically or empirically for the particular flow conditions or range of flow conditions in which the system is expected to operate.

The present invention has been shown and described with reference to the foregoing exemplary embodiments. It is to be understood, however, that other forms, details, and embodiments may be made without departing from the spirit and scope of the invention which is defined in the following claims.

What is claimed is:

1. An oscillating fluid flow motor, comprising:
   a support structure;
   an elongated swing arm pivotably and rotatably mounted to the support structure;
   a vane having a concave face, the vane connected to the swing arm so that, upon rotation of the swing arm about its longitudinal axis, the orientation of the concave face of the vane changes relative to a flow of fluid confronting the face;
   an elastic link operatively coupled in tension between the swing arm and a support; and
   a direction control mechanism coupled to the vane, the direction control mechanism operative to selectively re-orient the vane in the flowing fluid at each of two points which define the ends of a bidirectional stroke of the swing arm.

2. The motor of claim 1, wherein the direction control mechanism is coupled to the vane through the swing arm, the direction control mechanism operative to reorient the vane by rotating the swing arm about its longitudinal axis.

3. The motor of claim 1, wherein the elastic link is coupled to the swing arm below the point at which the swing arm pivots relative to the support structure and the support is positioned upstream of the vane.

4. The motor of claim 1, wherein the elastic link is coupled to the swing arm above the point at which the swing arm pivots relative to the support structure and the support is positioned downstream of the vane.

5. The motor of claim 1, wherein the elastic link is coupled to the swing arm through a flexible joint configured to allow the link and the swing arm to pivot relative to one another about at least two axes.

6. The motor of claim 1, wherein the elastic link is an extension spring.

7. The motor of claim 1, wherein the direction control mechanism comprises a limit arm extending out from the swing arm and a pair of opposable stops disposed on opposite sides of the limit arm to interfere with the limit arm at the end of each stroke of the swing arm.

8. The motor of claim 7, wherein the stops comprise rollers.

9. The motor of claim 7, wherein each stop comprises a magnet polarized to repel the limit arm as it approaches the stop.

10. An oscillating fluid flow motor, comprising:

a support structure;

an elongated swing arm pivotably and rotatably mounted to the support structure;

a vane having a concave face, the vane connected to the swing arm so that, upon rotation of the swing arm about its longitudinal axis, the orientation of the concave face of the vane changes relative to a flow of fluid confronting the face;

an elastic link operatively coupled in tension between the swing arm and a support;

a direction control mechanism coupled to the swing arm, the direction control mechanism operative to selectively rotate the swing arm about its longitudinal axis at each of two points which define the ends of a bidirectional stroke of the swing arm;

a receiving machine; and a connecting rod between the swing arm and the receiving machine, the connecting rod coupled to the swing arm through a flexible joint configured to allow the connecting rod and the swing arm to pivot relative to one another about at least one axis.

11. The motor of claim 10, wherein the connecting rod is coupled to the upstream side of the swing arm below the point at which the swing arm pivots relative to the support structure.

12. The motor of claim 10, wherein the connecting rod is coupled to the downstream side of the swing arm above the point at which the swing arm pivots relative to the support structure.

13. The motor of claim 10, wherein the receiving machine comprises a pump.

14. The motor of claim 10, wherein the receiving machine comprises an electric generator.

15. The motor of claim 10, wherein the receiving machine comprises a mill.

16. A fluid flow power system, comprising:

a channel;

fluid flowing through the channel;

an elongated swing arm pivotably mounted in or over the channel;

a vane connected to the swing arm, the vane having a concave face confronting the flowing fluid;

an elastic link operatively coupled in tension to the swing arm;

a direction control mechanism coupled to the swing arm, the direction control mechanism operative to selectively rotate the swing arm about its longitudinal axis to re-orient the vane in the flowing fluid at each of two points which define the ends of a bidirectional stroke of the swing arm; and a receiving machine operatively coupled to the swing arm.

17. The system of claim 16, wherein at least a portion of the channel immediately adjacent the vane is lined with a protective coating.

* * * * *